US012752137B2

(12) United States Patent
Fletcher

(10) Patent No.: US 12,752,137 B2
(45) Date of Patent: Oct. 6, 2026

(54) FOREST FIRE SUPPRESSION SYSTEM

(71) Applicant: Cory Fletcher, Bonnyville (CA)

(72) Inventor: Cory Fletcher, Bonnyville (CA)

(73) Assignee: Cory Fletcher, Alberta (CA)

( * ) Notice: Subject to any disclaimer, the term of this patent is extended or adjusted under 35 U.S.C. 154(b) by 197 days.

(21) Appl. No.: 18/737,248

(22) Filed: Jun. 7, 2024

(65) Prior Publication Data

US 2025/0375633 A1 Dec. 11, 2025

(51) Int. Cl.
*A62C 3/02* (2006.01)

(52) U.S. Cl.
CPC ............ *A62C 3/025* (2013.01); *A62C 3/0271* (2013.01)

(58) Field of Classification Search
CPC ....... A62C 35/06; A62C 35/13; A62C 3/0235; A62C 3/0292; A62C 31/12; A62C 99/0036; A62C 19/00
See application file for complete search history.

(56) References Cited

U.S. PATENT DOCUMENTS

| | | | |
|---|---|---|---|
| 8,746,355 B2 | 6/2014 | Demmitt | |
| 10,429,160 B2 | 10/2019 | Erickson et al. | |
| 11,224,773 B1 | 1/2022 | Strickland | |
| 11,560,229 B2 | 1/2023 | Luca | |
| 2009/0205845 A1 | 8/2009 | Hoffman | |
| 2012/0138319 A1 | 6/2012 | Demmitt | |
| 2016/0082298 A1 | 3/2016 | Dagenhart | |
| 2017/0007865 A1 | 1/2017 | Dor-El et al. | |
| 2021/0322805 A1 | 10/2021 | Detweiler et al. | |
| 2022/0143442 A1* | 5/2022 | MacNeal | A62C 37/04 |
| 2024/0149090 A1* | 5/2024 | Dreisilker | A62C 3/07 |
| 2025/0205528 A1* | 6/2025 | Hakos | A62C 35/026 |

FOREIGN PATENT DOCUMENTS

| | | | | |
|---|---|---|---|---|
| CN | 106669071 | | 5/2017 | |
| CN | 106669072 A | * | 5/2017 | A62D 1/0071 |
| CN | 111569316 A | | 8/2020 | |
| CN | 117224871 A | | 12/2023 | |
| JP | 3224081 U | * | 11/2019 | |
| KR | 102505673 B1 | | 3/2023 | |
| WO | WO-2007110457 A1 | * | 10/2007 | F17C 1/00 |
| WO | WO-2010083890 A1 | * | 7/2010 | A62C 3/0235 |
| WO | 2021174291 A1 | | 9/2021 | |
| WO | 2022271126 A2 | | 12/2022 | |

* cited by examiner

*Primary Examiner* — Steven M Sutherland
(74) *Attorney, Agent, or Firm* — Jordan Sworen; Daniel Enea; Argus Intellectual Enterprises, LLC

(57) ABSTRACT

A forest fire suppression system includes one or more satellites having a thermal imaging sensor configured to detect hot spots that are indicative of a forest fire. The satellites are further configured to transmit an alert signal to an emergency authority via a wireless network when a hot spot is detected. An unmanned aerial vehicle (UAV) is remotely controlled by an individual at the emergency authority. The UAV is configured to carry a crate filled with a plurality of fire suppression foam bombs. Each individual fire suppression foam bomb includes a housing configured to be filled with a pressurized foam material, a denotation mechanism, a microcontroller, and an outlet nozzle on the housing. Each individual fire suppression foam bomb is adapted to disperse the foam material when dropped by the UAV from above the forest fire. The system provides a cost-effective and efficient way to detect and extinguish forest fires.

14 Claims, 3 Drawing Sheets

FOREST FIRE SUPPRESSION SYSTEM

BACKGROUND OF THE INVENTION

The present invention relates to systems for detecting, suppressing, and ultimately extinguishing forest fires. The present invention provides a forest fire suppression system that quickly and accurately detects forest fires, notifies emergency authorities of their location, and allows individuals at the emergency authority to pilot a UAV carrying multiple fire suppression foam bombs to the fire location. The system further allows for precise control over the dispersion of the foam bombs and their expulsion of a fire suppressing foam, which in turn reduces costs and enhances efficiency when combatting forest fires.

Forest fires occur throughout the world in wooded areas, particularly during droughts or dry seasons. Forest fires can occur naturally due to lightning strikes but can also occur due to accidental or purposeful manmade causes when an individual lights a fire in or around a forest. Forest fires differ from other smaller fires due to their potential to grow to a massive size, the speed at which they can spread from the original source, and their potential to change direction unexpectedly. Forest fires can grow to cover vast areas in a very short time thereby threatening residential and commercial areas surrounding the forest. In addition to endangering animals and humans, forest fires result in huge firefighting costs and other economic losses. It can take decades for a forest that has been devastated by a large fire to fully recover.

One common method of fighting a fire is to spray water on the fire with a hose fed by a water main, a water tanker, a lake, or a stream. Another method is to use a helicopter or airplane to drop water on the fire from the air. The water lowers the temperature of the fire and removes some of the oxygen in the air around the fire when the water is converted into water vapor. However, water may not be the best extinguishing material to use in this context. For example, during the extinguishing process, large quantities of water are lost due to evaporation. Other water flows away from the drop site and may cause unnecessary water damage. Use of water is particularly disadvantageous in fighting forest fires because such fires are frequently preceded by a period of drought, and, accordingly, the ground has a particularly high-water absorptive capacity. To address this, the aircraft must make a considerable number of return trips in order to refill its water tank. Even in the case where improved extinguishing agents such as wet and dry foams are utilized, there is still massive waste when such materials are expelled midair from a single aircraft. Even the most skilled pilots cannot ensure that all of the extinguishing material makes it to the desired location.

For some forest fires, emergency authorities also use on-ground techniques. This requires the coordination and deployment of emergency response personnel and equipment. In addition to spraying water and other extinguishing agents from vehicles and other ground-based sources, firebreaks are often utilized to define a non-combustible area that will stop the further spread of the fire. Trenches are dug and vegetation removed to create a line which the fire cannot cross. This is an inherently risky process because it requires individuals and expensive equipment to be used dangerously close to the fire itself. Another method of fighting forest fires is to remove the fuel by removing undergrowth and trees in the fire's path or by backburning an area in front of the fire. Back burning operations also involve inherent risk, especially in the case of a change in the direction of prevailing winds. Backburning, firebreak digging, and other on-ground operations intended to combat the fire require the coordination of large numbers of emergency responders and large amounts of equipment. In addition to the danger the fire presents to the humans on the ground, the time, effort, and cost of coordinating these efforts can be enormous.

The foregoing methods are typically utilized once the forest fire has been located and personnel or equipment have arrived at the site of the fire. The delay in locating and delivering a response to suppress and extinguish the fire often results in the forest fire burning a large area before the fire can be brought under control. A forest fire suppression system that that can immediately identify the location of a new forest fire and quickly deliver a response to suppress and extinguish the forest fire in its beginning stage is therefore desired.

Some more advanced techniques used to fight forest fires include the utilization of individual foam-releasing devices that are dropped around the fire. However, these are not without their drawbacks. Individual foam-releasing devices are often not reusable and do not address the issue of the recovery of the forest after the fire. These individual foam-releasing devices known in the art also lack important features such as the ability to be contained in a crate or other mechanism that would allow for a coordinated drop of multiple devices.

Recognizing these gaps in the current state of the art, the present invention addresses the problem of how to extinguish forest fires efficiently, safely, and in a cost-effective manner. The present invention provides a forest fire suppression system that allows for precise control of the spread of the extinguishing materials before it can expand to cause additional harm.

In light of the systems and methods disclosed in the known art, it is submitted that the present invention substantially diverges in design elements and methods from the known art and consequently it is clear that there is a need in the art for an improvement in forest fire suppression systems. In this regard the instant invention substantially fulfills these needs.

SUMMARY OF THE INVENTION

In view of the foregoing disadvantages inherent in the known systems for combatting forest fires now present in the known art, the present invention provides a forest fire suppression system that utilizes a multitude of fire suppressing foam bombs, dispersed over a controlled area, in order to quickly and efficiently extinguish a fire that has been detected via thermal imaging satellites.

It is an objective of the present invention to provide a forest fire suppression system which includes a satellite comprising a thermal imaging sensor that is configured to detect a hot spot having an average temperature within a predetermined area greater than a threshold average temperature that is indicative of a forest fire, the satellite further configured to transmit an alert signal to an emergency authority via a wireless network when a hot spot is detected. The system further includes a UAV configured to be remotely controlled by an individual at the emergency authority, the UAV further configured to carry a crate filled with a plurality of fire suppression foam bombs. Each individual fire suppression foam bomb of the plurality of fire suppression foam bombs comprises a housing configured to be filled with a pressurized foam material, a denotation mechanism, a microcontroller, and an outlet nozzle on the housing. Each individual fire suppression foam bomb is adapted to disperse a volume of the pressurized foam material via the outlet nozzle when the detonation mechanism is activated by the microcontroller after the fire suppression foam bomb is dropped by the UAV.

It is another objective of the present invention to provide a new and improved forest fire suppression system that can quickly detect hot spots that are indicative of a forest fire. Early and accurate detection of hot spots will improve response times and ensure efforts to extinguish the fire happen as soon as possible.

It is a further objective of the present invention to provide a new and improved forest fire suppression system that uses modular crates which hold an array of multiple fire suppression foam bombs, such that individual fire suppression foam bombs can be dropped at precise locations in an around a forest fire, in order to extinguish the fire quickly and efficiently.

It is yet another objective of the present invention to provide a forest fire suppression system that includes a database for storing individual campfire permits corresponding to particular geographic locations, in order to reduce false alerts.

It is a further objective of the present invention to provide a forest fire suppression system that utilizes fire suppression foam bombs which are recoverable and reusable, thereby increasing the cost-savings of this particular method of fighting forest fires.

It is another objective of the present invention to provide a forest fire suppression system that will improve evacuation times in areas surrounding the detected forest fires.

Still a further objective of the present invention is to provide a forest fire suppression system that allows a single UAV operator to extinguish large fires from a distance, increasing safety by reducing or eliminating the need for emergency personnel on the ground to combat the fire.

Yet another objective of the present invention is to provide a forest fire suppression system that increases efficiency and reduces costs when compared to current firefighting techniques.

It is a further objective of the present invention to provide a forest fire suppression system that includes a reseeding system for re-introducing native plants to the area in and around the forest fire after it has been extinguished, which will increase the speed at which the local flora and fauna recover from the fire.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings.

DETAILED DESCRIPTION OF THE INVENTION

Reference is made herein to the attached drawings. For the purpose of presenting a brief and clear description of the present invention, the preferred embodiment will be discussed as used for detecting, responding to, and ultimately extinguishing forest fires. The figures are intended for representative purposes only and should not be considered to be limiting in any respect.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

Figure 1:
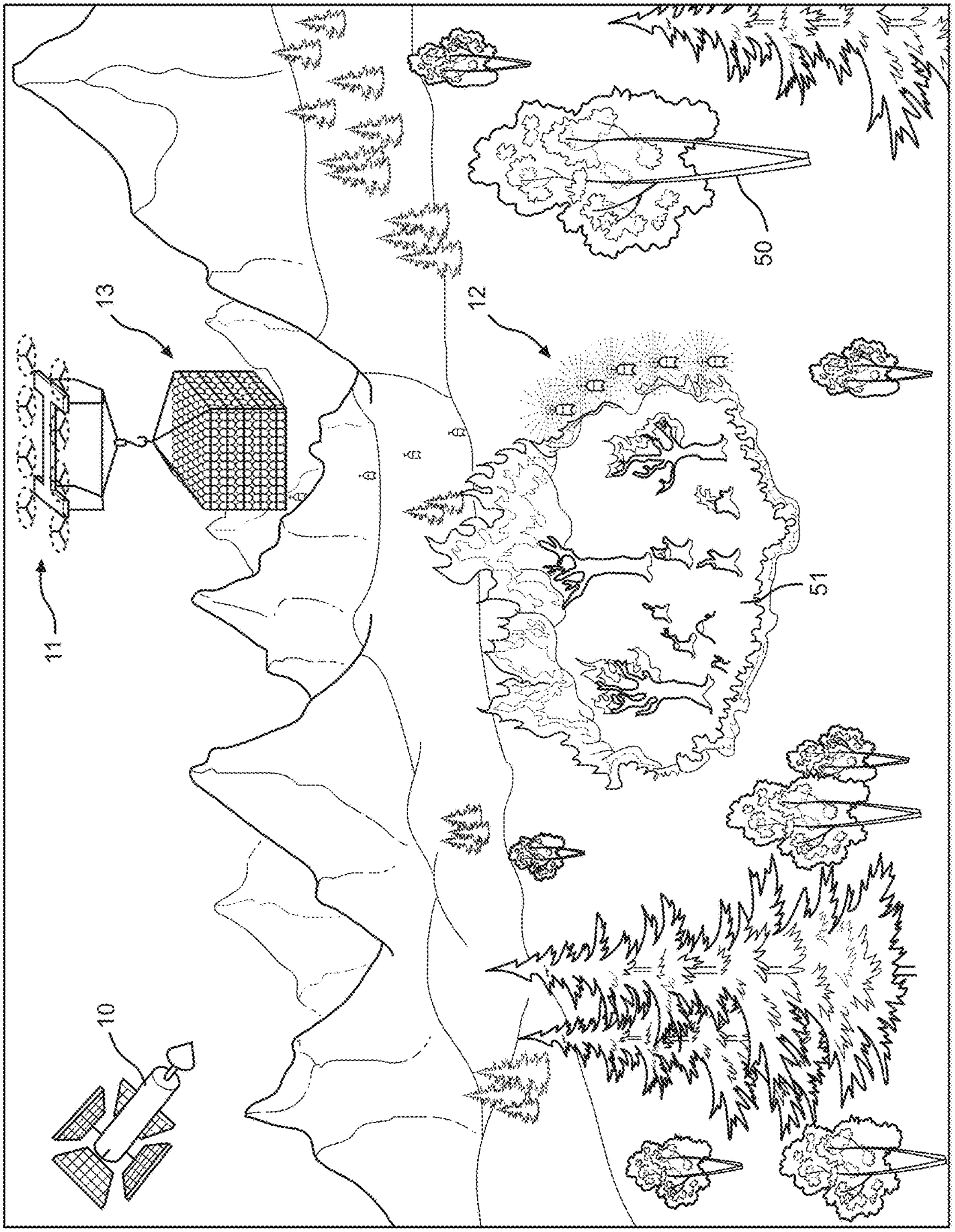
FIG. 1 shows a perspective illustrative view of an embodiment of the forest fire suppression system in use to combat forest fires.

Referring now to FIG. 1, there is shown a perspective view of an embodiment of the forest fire suppression system in use to combat a forest fire. The forest fire suppression system includes at least one satellite 10 that is configured to detect a hot spot 51 indicative of a forest fire. The satellite 10 can be a part of a network of orbital satellites that is capable of detecting a forest fire anywhere across the globe. The satellite 10 includes a heat detection mechanism such as a thermal imaging camera or similar sensor, for example. This allows the satellite 10 to distinguish between non-burning forest areas 50 and the hot spots 51. In some embodiments, the system includes a database which can have the locations of permitted campfires stored thereon. This will help to reduce the occurrence of false-positives when detecting for hot spots 51 that indicate a forest fire is present.

The satellite 10 is configured to detect a hot spot having an average temperature within a predetermined area greater than a threshold average temperature that is indicative of a forest fire. The satellite 10 is further configured to transmit an alert signal to an emergency authority via a wireless network when a hot spot 51 is detected. When a hot spot 51 is detected by the satellite 10, an alert signal is communicated to a fire department or other emergency authority that is tasked with responding to and extinguishing forest fires.

An individual at the emergency authority has remote control over an unmanned aerial vehicle (hereinafter, "UAV") 11 which is configured to carry a crate 13 filled with a plurality of fire suppression foam bombs 11. The UAV 11 is piloted to a location above the forest fire and includes cameras and other sensors so the operator can confirm the presence of the forest fire. In one embodiment, the UAV 11 includes eight propellors to increase lift capacity for heavy loads. In such an embodiment, the diameter of each of the eight propellors may be equal to the radius of the propellers on a dual-propellor helicopter. This allows the UAV 11 to have a max lift capacity exceeding that of two individual dual-propellor helicopters. The UAV 11 may also include flame resistant materials and coatings to prevent heat and water damage when getting close to the forest fire.

The individual fire suppression foam bombs 12 are dropped from the crate 13 as the UAV 11 circles above the detected hot spot 51. The UAV 11 has therefore precise control of the location of which the foam bombs 12 are dropped, in order to maximize their effect when releasing foam fire suppressing materials in and around the fire. In one embodiment, a system determines the optimal drop pattern and location based on the thermal readings. In the shown embodiment, the crate 13 is attached to the UAV via a cable. The crate 13 can hold many fire suppression foam bombs 12. In one embodiment, the crate 13 can hold up to 180 fire suppression foam bombs 12. The crate 13 may also include attachment mechanism for securing additional crates filled with additional foam bombs thereto. This modular approach allows the system to be scaled up to combat even the largest forest fires. Further, the crate 13 has a release mechanism that allows for the release of individual foam bombs 12, either in groups or one at a time. Such a release mechanism may include a trapdoor beneath each foam bomb 12, for example. The release mechanism may be operably connected to the UAV 11 such that the operator or control mechanisms of the UAV 11 can cause the release of the individual foam bombs 12. Each individual foam bomb 12 is configured to release a fire suppressing foam material that extinguishes the surrounding flames.

Figure 2:
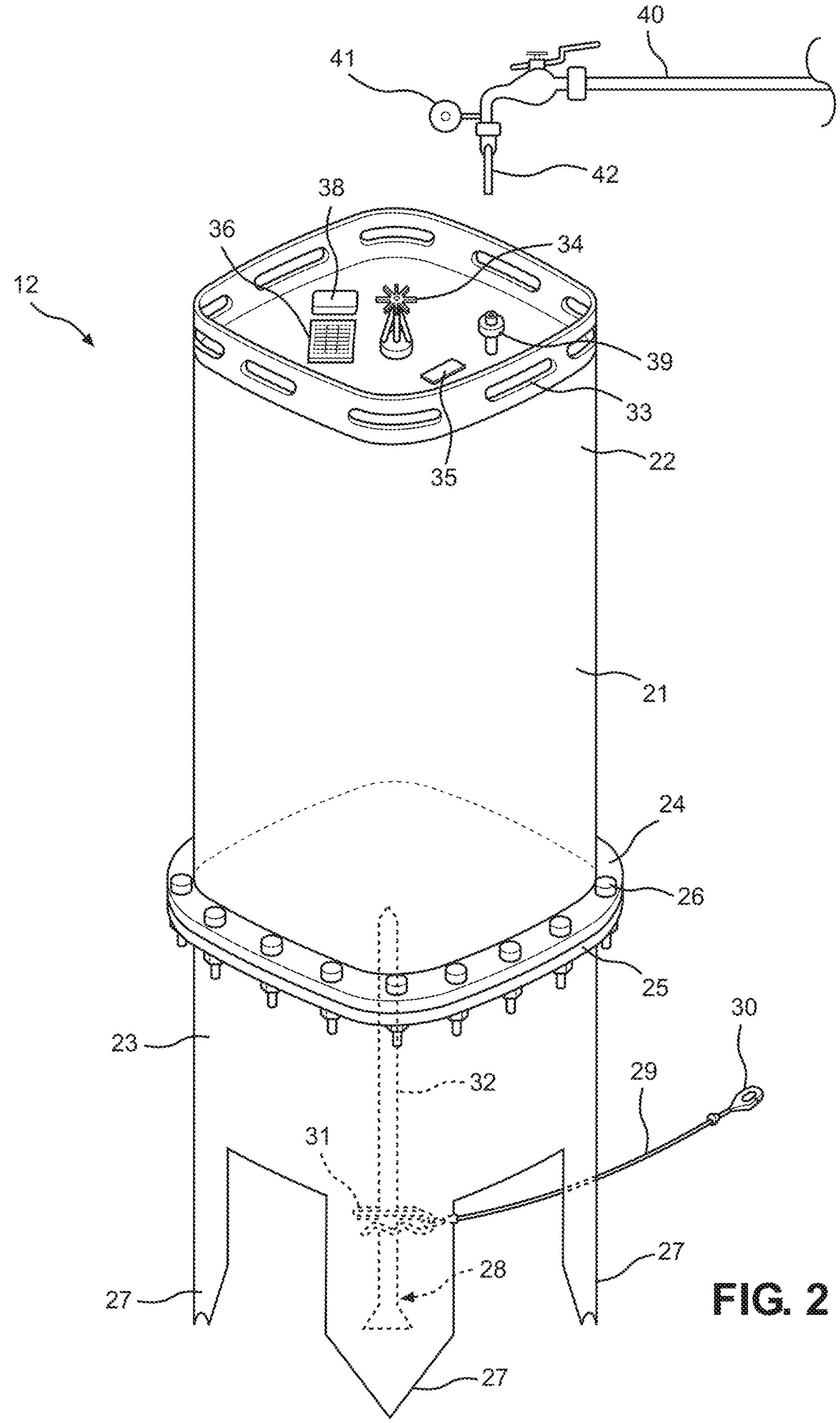
FIG. 2 shows a perspective view of an individual fire suppression foam bomb from an embodiment of the forest fire suppression system.

Referring now to FIG. 2, there is shown a perspective view of an individual fire suppression foam bomb from an embodiment of the forest fire suppression system. Each fire suppression foam bomb 12 includes a housing 21 which houses the fire suppressing foam therein. The housing 21 is preferably made from extremely heat resistant and durable materials, such as titanium, as one example. In the illustrated embodiment, the housing 21 includes an upper portion 22 defining a first interior volume and a lower portion 23 defining a second interior volume. In the shown embodiment, the housing 21 is shown in an upright configuration. A flange 24 of the upper portion 22 is configured to align with and to be secured to a corresponding flange 25 of the lower portion 23 via a plurality of fasteners 26. In the illustrated embodiment, the fasteners are nuts and bolts, but other suitable fasteners may be utilized. Each foam bomb 12 includes a center of gravity positioned beneath the upper portion 22 of the housing 21, such that each individual fire suppression foam bomb 12 is bottom-heavy. The lower portion 23 of the housing 21 also includes a plurality of ground spikes 27. In combination, this ensures that the foam bombs 12 remain upright and implanted in the ground in the desired location, in order improve the effectiveness of the foam bomb's extinguishing capabilities.

The interior volume of the upper portion 22 of the housing 21 is configured to be filled with a wet foam fire suppressing material. The upper portion 22 includes a foam inlet 39 that is configured to secure to a foam filling nozzle 42 via a threaded connection or other secure fit. The foam filling nozzle 42 includes a pressure gauge 41 to ensure a desired high pressure of the foam is maintained. The foam filling nozzle 42 connects to a high pressure fill line 40 that itself supplies the foam material. In one embodiment, the foam pressure can reach up to 10,000 psi. The lower portion 23 of the housing 21 is configured to be filled with a reactant material that, when combined with the wet foam in the upper portion 22, causes a reaction that further increases the pressure of the resultant mixture. When mixed, the resulting material increases in pressure until it is automatically expelled via an outlet nozzle 34. The mixed foam material then contacts the areas in and around the fire to extinguish the flames. The upper portion 22 of the housing 21 can be recovered after the foam bomb 12 is used to extinguish the fire, and a new lower portion 23 can be attached, allowing the foam bombs 12 to be recoverable and reusable. The upper portion 22 of the housing 21 also includes handles 33 which allow for easier handling of the foam bombs 12, particularly when they are loaded into their crate prior to being used.

A computer such as a microcontroller 35 is configured to control the functions of the foam bomb 12. The microcontroller 35 is operably connected to a detonation mechanism 28. The microcontroller 35 and other electronic components of the foam bomb 12 are powered via an internal battery, which itself is rechargeable via a solar panel 36. When activated via the microcontroller 35, the detonation mechanism 28 is configured to break the barrier between the upper portion 22 and lower portion 23 of the housing 21, allowing intermixing of their contents to form the increased pressure foam mixture. In the illustrated embodiment, the detonation mechanism 28 comprises a concussion rod 32 that is configured to pierce the upper portion 22 of the housing 21, which causes the upper portion 22 to be in fluid communication of the lower portion 23, allowing intermixing of their contents. The concussion rod 32 can be activated via the microcontroller 35 upon receiving an operator command or can be configured to activate manually in response to a sensed condition such as a particular altitude, temperature, or GPS position. The concussion rod 32 can also be activated via ground contact.

In the shown embodiment, the concussion rod also includes a safety interlock comprising a cable 29 attached to a cotter pin 31. When the cotter pin 31 is in place, the detonation mechanism 28 is prevented from activating, for example, when individuals are loading the foam bombs 12 into their carrying crates prior to use. When removed, the detonation mechanism 28 can activate. A clip 30 attached to the cable can be subsequently attached to the crate or UAV, such that dropping the foam bomb 12 pulls the cotter pin 31 to allow for a subsequent detonation at the right time. In other embodiments, other detonation mechanisms may be utilized, including but not limited to an operator control, a timed detonator, or other means.

In the shown embodiment, the foam bomb 12 also includes a replaceable parachute 38 that can be selectively deployed to slow the descent of the foam bomb 12 when it is dropped from the UAV. The parachute 38 can be configured to deploy automatically or upon receiving a command signal from the UAV operator. This allows the foam contents to be released above the fire continuously as the foam bomb 12 slowly descends. The parachute 38 also helps maintain the desired upright orientation of the foam bomb 12.

Figure 3:
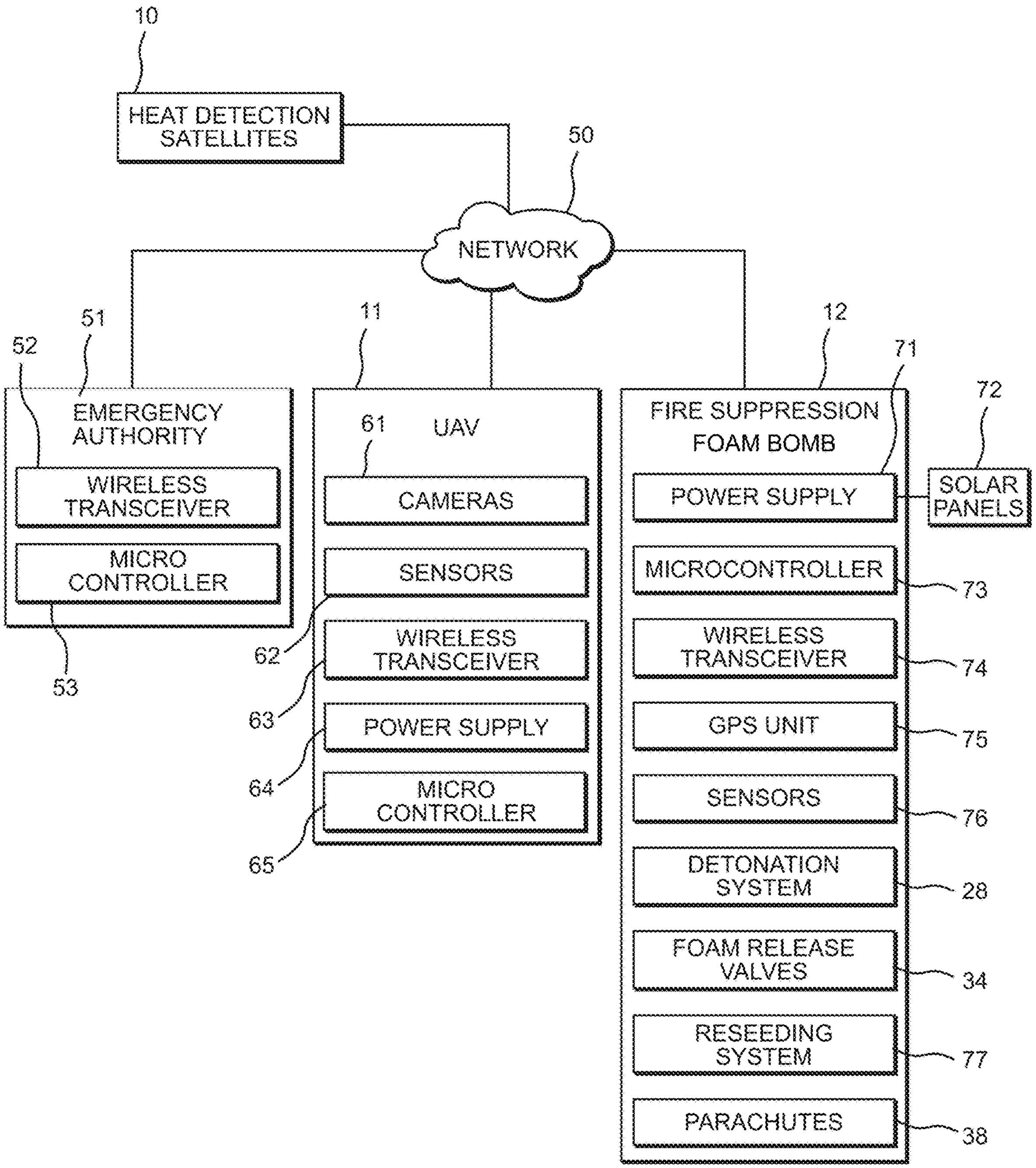
FIG. 3 shows a diagram of the components of an embodiment of the forest fire suppression system.

Referring now to FIG. 3, there is shown a diagram of the components of an embodiment of the forest fire suppression system. In operation, the heat detection satellites 10 detect a hot spot, and then communicate with an emergency authority 51 via a wireless network 50. The emergency authority has access to a device that includes at least its own microcontroller 53 and wireless transceiver 52 which allows for control over and communication with the UAV 11. The UAV includes cameras 61 that transmit images of the surrounding area to the operator at the emergency authority 51 via a wireless transceiver 63. The UAV 11 also includes sensors 62 such as altitude sensors, GPS sensors, and heat sensors, for example.

Each fire suppression foam bomb 12 includes a power supply 71 which is a rechargeable battery operably connected to solar panels 72. The power supply 71 powers the various electronic components of the foam bomb 12, including the detonation system 28. When activated, the detonation system 28 causes the dry and wet materials in the housing to mix and increase in pressure. Once a predetermined max pressure is reached, such as 10,000 psi, as one example, the resulting mixture is automatically sprayed into the surrounding environment via the foam release valves 34.

The parachute 38 can be deployed to slow the descent of the foam bomb 12 and release the mixture overtop a selected area of the fire if needed.

In some embodiments, the fire suppression foam bomb 12 also includes a reseeding system 77. Native plant seeds are stored within the foam bomb 12 and are released upon receiving a signal from the microcontroller 73. The seeds can be realized using the foam release valves 34 or may have their own release valve. The seeds can be released automatically when a condition is sensed, such as a threshold low temperature after the fire has gone out, for example, or can be released manually by an operator, who is connected to the foam bomb 12 remotely via the wireless transceiver 74. A GPS unit 75 determines the geographic location of the foam bomb 12 to confirm it is in the desired position and to allow for easier recovery after the fire is extinguished. Its location can be transmitted to the emergency authority 51 via the wireless network 50.

In operation, once the satellite 10 detects a hot spot, alerts which may take the form of phone calls, texts, emails, and other alerts are immediately sent to the nearest emergency authority, along with the geographic coordinates of the detected hot spot. When the emergency authority confirms a forest fire is present, they can deploy the UAV 11 which is controlled remotely with a computer or similar device. The cameras 61 and sensors 62 allow the pilot to fly the UAV 11 in and around the forest fire. The operator can then drop the individual foam bombs 12 around the perimeter of the forest fire in order to control and ultimately extinguish it before it becomes too large and widespread. Ideally, a single foam bomb 12 is capable of extinguishing up to 100 square feet of forest fire. The foam bombs 12 can therefore be dispersed in and around the fire for maximum effect. Once the foam bombs 12 have expelled their contents, the reseeding system 77 can be activated to expel native plant seeds in the surrounding area, which will help the area recover from the fire more quickly.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A forest fire suppression system, comprising:

a satellite comprising a thermal imaging sensor that is configured to detect a hot spot having an average temperature within a predetermined area greater than a threshold average temperature that is indicative of a forest fire, the satellite further configured to transmit an alert signal to an emergency authority via a wireless network when a hot spot is detected;

a UAV configured to be remotely controlled by an individual at the emergency authority, the UAV further configured to carry a crate filled with a plurality of fire suppression foam bombs, and further configured to drop each of the plurality of fire suppression foam bombs individually;

wherein each individual fire suppression foam bomb of the plurality of fire suppression foam bombs comprises a housing configured to be filled with a pressurized foam material, a detonation mechanism, a microcontroller, an outlet nozzle on the housing, and a plurality of ground spikes extending downwardly from the housing;

wherein each individual fire suppression foam bomb is adapted to disperse a volume of the pressurized foam material via the outlet nozzle when the detonation mechanism is activated by the microcontroller after the fire suppression foam bomb is dropped by the UAV.

2. The forest fire suppression system of claim 1, wherein each individual fire suppression foam bomb further comprises a reseeding mechanism configured to disperse a plurality of plant seeds when activated by the microcontroller.

3. The forest fire suppression system of claim 1, wherein each individual fire suppression foam bomb further comprises a parachute configured to be selectively deployed upon receiving a deployment signal from the microcontroller.

4. The forest fire suppression system of claim 1, wherein each individual fire suppression foam bomb further comprises a power supply comprising a rechargeable battery that is operably connected to a solar panel configured to charge the rechargeable battery.

5. The forest fire suppression system of claim 1, wherein each individual fire suppression foam bomb further comprises an inlet disposed on the housing, the inlet configured to receive pressurized foam material from a foam filling nozzle.

6. The forest fire suppression system of claim 1, wherein the UAV is configured to carry the crate via a cable that attaches between the UAV and the crate.

7. The forest fire suppression system of claim 1, wherein each individual fire suppression foam bomb further comprises a GPS unit configured to determine a geographic location of each individual fire suppression foam bomb and transmit the location to the emergency authority via a wireless transceiver.

8. The forest fire suppression system of claim 1, wherein each individual fire suppression foam bomb further comprises a plurality of handles.

9. The forest fire suppression system of claim 1, wherein each individual fire suppression foam bomb further comprises:

an upper portion comprising a first interior volume, the upper portion removably secured to a lower portion comprising a second interior volume, the first interior volume in fluid communication with the outlet nozzle;

wherein the first interior volume is configured to be filled with the pressurized foam material;

wherein the second interior volume is configured to be filled with a reactant;

wherein activation of the detonation mechanism is configured to cause intermixing of the pressurized foam material and the reactant to form a mixed foam solution, causing an increase in pressure which causes the mixed foam solution to be ejected from the housing via the outlet nozzle.

10. The forest fire suppression system of claim 9, wherein the upper portion of each individual fire suppression foam bomb further comprises a perimeter flange configured to align with a perimeter flange of the lower portion and be secured thereto via a plurality of fasteners.

11. The forest fire suppression system of claim 9, wherein the detonation mechanism comprises a concussion rod configured to pierce the upper portion of the housing into the first interior volume upon activation of the detonation mechanism, causing the first interior volume to be in fluid communication with the second interior volume.

12. The forest fire suppression system of claim 11, wherein the detonation mechanism comprises a safety interlock operably connected to the concussion rod, the safety interlock configured to prevent activation of the detonation mechanism when engaged, and permit detonation when disengaged.

13. The forest fire suppression system of claim 11, wherein each individual fire suppression foam bomb further comprises a center of gravity positioned beneath the upper portion of the housing in an upright configuration, wherein each individual fire suppression foam bomb is bottom heavy.

14. A forest fire suppression system, comprising:

a satellite comprising a thermal imaging sensor that is configured to detect a hot spot having an average temperature within a predetermined area greater than a threshold average temperature that is indicative of a forest fire, the satellite further configured to transmit an alert signal to an emergency authority via a wireless network when a hot spot is detected;

a UAV configured to be remotely controlled by an individual at the emergency authority, the UAV further configured to carry a crate filled with a plurality of fire suppression foam bombs, and further configured to drop each of the plurality of fire suppression foam bombs individually;

wherein each individual fire suppression foam bomb of the plurality of fire suppression foam bombs comprises:

a housing configured to be filled with a pressurized foam material, a detonation mechanism, a microcontroller, and an outlet nozzle on the housing;

an upper portion comprising a first interior volume, the upper portion removably secured to a lower portion comprising a second interior volume, the first interior volume in fluid communication with the outlet nozzle;

wherein the first interior volume is configured to be filled with the pressurized foam material;

wherein the second interior volume is configured to be filled with a reactant;

wherein activation of the detonation mechanism is configured to cause intermixing of the pressurized foam material and the reactant to form a mixed foam solution, causing an increase in pressure which causes the mixed foam solution to be ejected from the housing via the outlet nozzle;

wherein each individual fire suppression foam bomb is adapted to disperse a volume of the pressurized foam material via the outlet nozzle when the detonation mechanism is activated by the microcontroller after the fire suppression foam bomb is dropped by the UAV.

* * * * *